(12) United States Patent
Olsson

(10) Patent No.: US 6,266,667 B1
(45) Date of Patent: Jul. 24, 2001

(54) INFORMATION ROUTING

(75) Inventor: Tomas Olsson, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/229,767

(22) Filed: Jan. 14, 1999

(30) Foreign Application Priority Data

Jan. 15, 1998 (SE) .................................................. 9800076

(51) Int. Cl.$^7$ ...................................................... G06F 17/30

(52) U.S. Cl. ........................... 707/10; 707/103; 707/203; 709/203; 709/206; 709/228; 713/176; 379/220; 379/265

(58) Field of Search .................................. 707/7, 10, 103, 707/104, 3, 5, 200, 201, 203; 05/52, 54, 77; 712/14; 713/176, 200; 379/112, 113, 201, 207, 220, 265, 93.15; 709/201, 203, 206, 228, 230

(56) References Cited

U.S. PATENT DOCUMENTS

| | | | |
|---|---|---|---|
| 5,802,518 | * 9/1998 | Karaev et al. | 707/9 |
| 5,918,232 | * 6/1999 | Pouschine et al. | 707/103 |
| 5,956,397 | * 9/1999 | Shaffer et al. | 379/220 |
| 6,021,428 | * 2/2000 | Miloslavsky | 709/206 |
| 6,029,175 | * 2/2000 | Chow et al. | 707/104 |
| 6,055,308 | * 4/2000 | Miloslavsky et al. | 379/265 |
| 6,055,538 | * 4/2000 | Kessenich et al. | 707/101 |
| 6,088,698 | * 7/2000 | Lipkin | 707/10 |
| 6,088,717 | * 7/2000 | Reed et al. | 709/201 |
| 6,134,548 | * 10/2000 | Gottsman et al. | 707/5 |
| 6,167,122 | * 12/2000 | Titmuss et al. | 379/93.15 |
| 6,169,992 | * 1/2001 | Beall et al. | 707/103 |
| 6,178,455 | * 1/2001 | Schutte et al. | 709/228 |

OTHER PUBLICATIONS

Butler, G. et al., "Retrieving Information From Data Flow Diagrams", Proceedings of 2nd Working Conference on Reverse Engineering, Jul. 14–16, 1995, pp. 22–29.*

Kawasaki, Yukiko et al., "An Architecture of the Distributed Multimedia Information Retrieval Network With Query Routing Systems", 2000 IEEE International Conference on Multimedia and Expo, ICME 2000, Jul. 30–Aug. 2, 2000, pp. 1179–1182 vol. 2.*

David A. Maltz, "Distributing Information for Collaborative Filtering on Usenet Net News", 1994, pp. 1–78.

Martijn Koster, "Guidelines for Robot Writers", 1993, pp. 1–4.

Martijn Koster, "Robots in the Web: threat or treat?", Apr. 1995, pp. 1–10.

Beerud Dilip Sheth, "A Learning Approach to Personalized Information Filtering", Feb. 1994, pp. 1–27.

(List continued on next page.)

Primary Examiner—Hosain T. Alam
Assistant Examiner—Shahid Alam
(74) Attorney, Agent, or Firm—Burns, Doane, Swecker & Mathis, L.L.P.

(57) ABSTRACT

The present invention relates to a problem with how to automatically or semi-automatically find and retrieve information for a user according to his preferences, is solved by sending an information object from a first interest agent to a second interest agent. Said information object comprising electronic information, a first array of references to other interest agents which recommends the electronic information and a second array of references to other interest agents which are indifferent to the content of the electronic information. Said second interest agent comprises a third array, where each position in said array comprises references to other interest agents and a confidence value. If the first agent which sent the information object is found in said third array and has a high confidence value the electronic information is presented before a user.

19 Claims, 6 Drawing Sheets

OTHER PUBLICATIONS

Kritina Höök, "Steps to take before IUI becomes real", 1997. pp. 1–7.

Yezdi Lashkari, Max Metral, Pattie Maes, "Collaborative Interface Agents", 1994, pp. 1–5.

Peter Edwards, David Bayer, Clair, L. Green and Terry R. Payne, Experience with Learning Agents which Manage Internet–Based Information, 1996, pp. 1–10.

Marko Balabanovic and Yoav Shoham, "Learning Information Retrieval Agents: Experiments with Automated Web Browsing", 1997, pp. 1–6.

Annika Waern, "Recognising Human Plans: Issues for Plan Recognition in Human—Computer Interaction", 1996, pp. 1–42.

C. J. van Rijsbergen, "Information Retrieval, $2^{nd}$ Edition", 1979, 1–157.

Fredrik Kilander, Eva Fahraeus, Jacob Palme, "PEFNA The Private Filtering News Agent", Feb. 17, 1997, pp. 1–28.

K. Höök, "A Glass Box Approach to Adoptive Hypermedia", Chapter 2; "A Framework for Adoptive Systems", 1996, pp. 1.26.

William B. Frakes and Ricardo Baeza–Yates, "Information Retrieval Source Code—Information Retrieval: Data Structures and Algorithms", 1992, pp. 1–327.

G. Salton and C. Buckley, 1994, "SMART Information Retrieval System, Source Code", 1994.

Stephen Paul Marsh, "Formalising Trust as a Computational Concept", Apr. 1994, pp. 1–170.

M. Balabanovic and Y. Shoham, "Fab: Content–based, Collaborative Recommendation. In: Communication of the ACM, vol. 40, No. 3", 1997, pp. 66–72.

Balabanovic, M. 1996. An Adaptive Web Page Recommendation Service. Sanford University Digital Libraries Project Working Paper SIDL–WP–1996–0041. [Also revised version in: Proceedings of the First International Conference on Autonomous Agents (Agents '97). ACM Press. pp 378–385].

Chen, L. WebMate: A Personal Agent for World–Wide Web Browsing and Searching. [Web page with software]. Published prior to May 1, 1998.

Chauhan, D & Baker, B. 1997. JAFMAS, A java–based Agent Framework for MultiAgent Systems. Department of Electrical and Computer Engineering and Computer Science, University of Cincinnati, Ohio. [Web page with Java source code and documentation]. Published prior to May 1, 1998.

D'Aloisi, D & Giannini, V. 1995. The Info Agent: an Interface for Supporting Users in Intelligent Retrieval. In: Proceedings of "ERCIM Workshop on Towards User Interfaces for All: Current Efforts and Future Trends". Heraklion, pp 145–158.

Firefly Network, Inc. 1997. Collaborative Filtering Technology: An Overview.

Fischer, G & Christoph, T G. 1997. Using Agents to Personalize the Web. In: Proceedings of the International Conference on Intelligent User Interfaces (IUI'97). ACN Press. pp. 53–60.

Foner, L N. 1996. A Security Architecture for Multi–Agent Matchmaking. The Second International Conference on Multi–Agent Systems (ICMAS'96). Keihanna Plaza, Kansai Science City Japan.

Foner, L N. 1997. Yenta: A Multi–Agent, Referal–Based Matchmaking System. In: Proceedings of The First International Conference on Autonomous Agent (Agents ' 97). pp 301–307. ACM Press.

Foner L N. Cluster and Information Sharing in an Ecology of Cooperating Agents or How to Gossip without Spilling the Beans, pp 1–4. Published 1995.

Foner L N. Clustering and Information Sharing in an Ecology of Cooperating Agents. pp 1–4. Published 1995.

Foner L N. A Multi–Agent Referral System for Matchmaking. pp 1–8. Published Apr., 1996.

Foner L N. A brief introduction to Yenta. pp 1–2. Published prior to Apr., 1999.

Höök, K. 1996. A Glass Box Approach to Adaptive Hypermedia. Chapter 2; A framework for adaptive systems. Department of Computer and Systems Sciences, Stockholm University. Sweden. Ph.D. thesis.

IBM Corporation. 1996. WBI (Web Browser Intelligence) Personal Web Agent. [Web page with software].

IBM Research Report. Building Commerical Agents: An IBM Research Perspective (Invite Talk) Published May, 1997.

IBM Research Report. Globenet and RAISE: Intelligent Agents for Networked Newsgroups and Customer Service Support. Published Oct., 1995.

IBM Research Report. Reusable Architecture for Embedding Rule–based Intelligence in Information Agents. Published Dec., 1995.

Kautz, K & Milewski, A & Selman, B. 1996. Agent Amplified Communication. In: Proceedings of the Thirteenth National Conference on Artificial Intelligence (AAAI'96), vol. 1. AAAI Press/The MIT Press. pp 3–9.

Lieberman, H. 1995. Letizia: An Agent That Assists Web Browsing. In Proceedings of the International Joint Conference on Artificial Intelligence (IJCAI'95). Morgan Kaufmann Publishers.

March, S & Masrour, Y. 1997. Agent Augmented Community Information—The ACORN Architecture. In: Proceedings CASCON'97, Meeting of Minds.Menczer, F. 1997. ARACHNID: Adaptive Retrieval Agents Choosing Hearistic Neighborhoods for Information Discovery. In: Proceedings of the $14^{th}$ International Conference on Machine Learning (ICML '97).

Nwana, H S. 1996. Software Agents: An Overview. In: Knowledge Engineering Review, vol. 11, No. 3. Cambridge University Press. pp 1–40.

Pazzani, M & Muramatsu, J & Billsus, D. 1996. Syskill & Webert: Identifying interesting web sites. AAAI Spring Symposium. Stanford, California.

Sakagami, H & Kamba, T. 1997. Learning Personal Preferences On Online Newspaper Articles From User Behaviours. In: Hyperproceedings of the Sixth International world Wide Web Conference. Santa Clara, California Schoonderwoerd, R & Holland, O E & Bruten, J L & Rothkrantz, L J M. 1996. Ant–based load balancing in telecommunications networks. HP Technical Report HPL–96–76. Hewlett Packard.

Stone, P & Veloso, M. 1997. Multi–agent Systems: A survey from a Machine Learning Perspective. CMU CS technical report No. CMU–CS–97–193. Carnegie Mellon University Sun Microsystems, Inc. 1996. RMI—Remote Method Invocation.

UMBC KQML Web. What is KQML? Published prior to 1998.

Tim Finn and Richard Fritzson, KQML as an Agent Communication Language, pp 1–8, Published Feb., 1997.

Yannis Labrou and Tim Finin, A Proposal for a new KQML Specification, pp 1–42.

Tim Finin, Jay Weber, Gio Wiederhold, Michael Genesereth, The DARPA Knowledge Sharing Initiative External Interfaces Working Group, pp 1–34, Published Jun., 1993.

* cited by examiner

INFORMATION ROUTING

This application claims priority under 35 U.S.C. §§119 and/or 365 to 9800076-3 filed in Sweden on Jan. 15, 1998; the entire content of which is hereby incorporated by reference.

TECHNICAL FIELD OF INVENTION

The present invention relates in general to a method for finding and retrieving relevant electronic information and in particular to a method for finding and retrieving relevant electronic information from the Internet.

DESCRIPTION OF RELATED ART

Today the Internet is growing in a tremendous way, and the amount of information is overwhelming for the ordinary user. A big problem for a user is to find relevant information. There is also a problem for content providers to reach out with the information they want to deliver.

In the recent years a new paradigm has emerged on the Internet, the Software Agent. The users of such agents are supposed to get help to find relevant information. The agents are used in areas called Information Retrieval and Information Filtering. Often they use techniques from machine learning.

The Problem Area

When a user wants to find interesting documents on the WWW (World Wide Web), an active search of the web is necessary to retrieve the needed information. Some tools to help the user find relevant documents exists, but most of these tools use query-based techniques. The query-based techniques has properties which give results which include many irrelevant documents and exclude many relevant documents.

The usual way to get around this problem is to use different retrieval and filter techniques that are able to adapt to the user automatically or manually.

Hereinafter, a consumer is somebody who wants information, a content provider is somebody who provides information and artificial evolution is a machine learning technique that is inspired by evolution biology and uses mutations and reproduction to create programs. A consumer or a content provider may also be termed a user.

Filtering and Retrieval

There are mainly two ways to filter and retrieve information, the cognitive and the social techniques.

The cognitive or content-based approach analyses the content of the information and compares it to a model of the user. A closer match makes it more likely it will suit the user.

The social approach determines what is regarded as relevant information solely based on what different users are recommending. If a first user finds a particular kind of documents relevant, which other users found relevant too, then the first user will probably find one particular document relevant if the other users found it relevant.

There exist approaches that try to combine the above described two techniques. The usual information retrieval techniques are based on query refinement. The system uses the user's feedback to refine the query and get a better retrieval of documents.

This is a form of user modeling and can be categorized as a cognitive technique.

Content-Based examples

In the content-based approach the information is collected by an agent according to a user-profile or user-model from the content provider and is presented for the user.

A cognitive filtering example is Beerud Seth's Personalized Information Filtering *A learning approach to personalized information filtering, Master Thesis, MIT*. It uses an artificial evolution approach to build a user-model (or user-profile). As genotype it uses the user-profiles, but it also lets the profiles learn during their lifetime to make the adaptation faster, which is called the "Baldwin effect". Each profile search for documents and recommends them to the user. The user's response is used to change the fitness of the profile and to let it adapt during its lifetime. This approach, because of the evolutionary algorithm, tries to benefit from an effective parallel search.

An other example of the cognitive approach is The Info Agent D'Aloisi, D & Giannini, V *The info agent: an interface for supporting users in intelligent retrieval, Published on Internet*. The Info Agent consists of three different cooperating agents, the Interface Agent, the Internal Services Agent and the External Retrieval Agent. The Interface Agent builds a user-profile and it uses the profile to guide the two other agents' search for documents. The system is designed to be flexible to extensions and changes.

An example of information retrieval is Discover. Sheldon, M A & Duda, A & Weiss, R & Gifford, D K. *Discover: A resource discovery system based on content routing. Proceedings of the third international world wide web conference*, 1995. This document describes an architecture for a single point of access to over 500 WAIS servers. It provides two key services, query refinement and query routing. The user uses query refinement to make the query more precise. When the query is precise the query is routed to a suitable WAIS server to retrieve the relevant documents. The WAIS servers have local databases of documents and they coo-operate through a content router that the user can access.

Social Examples

In the social approach the information is collected from the content provider and stored by a consumer in a central repository and than retrieved again for another consumer that might store it again.

A social filtering system for net news is presented in Maltz, A D. *Distributed information for collaborative filtering on usenet net news. Master thesis, MIT*. In this system, each user can read an article and vote for or against it. The votes are then sent to a vote server where the votes are grouped together and shared with other vote servers. The servers aggregate all the different readers' opinions into one collective opinion. This aggregated opinion is then used by news-readers to filter shown articles.

Firefly, http://www.firefly.net, is one of the best-known social filtering systems. The technique is called Feature-Guided Automated Collaborative Filtering. This filtering technique builds a profile of each user with their opinions for different documents. The documents are divided in different groups (classes of documents) and for each group the users are clustered in a nearest "neighbor" style. For each group of documents the users' opinions in the same cluster are compared. To find documents to recommend, firefly matches all users in a cluster (this is somewhat simplified to increase understandability). If two users have approximately the same opinions for most of the documents in a group, but they have not read all of them, then it is likely that the users would like the unread documents of the group too.

Combined Techniques

In combined techniques, the information flow is the same as for the social techniques.

Marko Balabanovic, *An adaptive web page recommendation service. Stanford digital library project working paper*

*SIDL-WP*-1996-0041, describes an example which utilizes both filtering techniques. This architecture consists mainly of two kinds of agents, a selection agent (one for each user) and a collection agent. The collection agent collects information and deliver documents to a central repository, where from, the selection agents filter interesting documents according to a user-profile. Responses from the users are used to modify both the selection agent and the collection agent. If a document matched a user, the collection agent that found this document is "rewarded" and the agent is thus encouraged to specialize in a certain kind of documents. The user is also able to grade a sample of pages. The selection agent sends the pages that the user grades as very interesting to neighbor users with the same interests. The selection agent also handles the recommended pages in the same way as other pages from the repository. This means that if the pages do not match the user's profile they are not presented to the user, and this also then means that the gain from social filtering is very limited.

Collaborative Agents that Share Information

Yet another approach is where the information is collected from the content provider, which might be a consumer too, and then sent to another consumer, which might also be a provider.

An example with collaborative agents is Yenta, Foner, L N. *Yenta: A multi-agent, referral-based matchmaking system. The first international conference on autonomous agents,* Agents '97, Marina del Rey, Calif. February 1997. In this system the agents try to build a model of the users' interests and use the model to find other agents with the same preferences. This document mainly addresses the problem for agents to find each other without any central control. The approach is to let the agents self-organize into clusters with other agents with similar interests. This self-organizing is achieved by referrals, that is through knowledge about other agents and other agents' knowledge about further other agents, etc.

In the document Kautz, K & Milewski, A & Selman, B. *Agent amplified communication. Information gathering from heterogeneous, distributed environments,* AAAI Spring Symposium Series. March 1995, a similar approach is taken as the Yenta approach. This system is also using agents to find people, but are trying to find experts in some domain through referrals. It assumes that the user know who to contact in first place, and let the agent explicitly ask the user to form the user-model.

ACORN, http://ai.iit.nrc.ca, is another example. A provider that wants to inform interested consumers launches a so called InfoAgent, here called provider agent, that knows about some places with consumers. The provider agent goes to the consumer agents and ask them if they are interested. To find more agents the provider agent can go to a meeting place for agents with special interests. There it communicates with other agents and receives information about other places with users or other meeting places to visit, and in this way it searches and provides information. ACORN have both the consumers and the content providers in focus, but the consumer is passive, whereas the provides is active. The provider agent has the main responsibility to find interesting consumers.

Problems with Known Solutions

For content based techniques a problem with the so called cold start arise. The cold start problem means that the agent has no knowledge of the preferences of the user when it starts. It must have some time to learn what preferences the user has and during that time the agent is not performing very well.

Another problem with the content-based techniques is the static view of the content providers. The static view problem means that when the content providers have delivered information, the information is static and do not change. This problem might be solved by polling the providers for updates, but then problems with polling frequency and capacity, in case of to frequent polling, might arise.

Yet another problem with the content-based approach is the problem of downloading, which means that each agent has to download all information by themselves to find what is interesting. If many users have such agents, the result will be many accesses to the providers with corresponding problems with capacity and bandwidth.

Another problem with the content-based approach is serendipity problems, which means that there is a problem for the consumer to find information of a sort it has not earlier encountered and has no knowledge of. Such information might be filtered out by the agent since the agent might believe that information is not interesting.

One major problem with the social approach is that of centralization. This is a very large bottle-neck for scalability and availability, and a risk for the users' integrity. The scalability is a problem because the straightforward solution is to compare all users' profiles to match them, which is a search of quadratic-order. Users' integrity is at risk since the system has sensitive information gathered at one location. An unauthorized person might by breaking in to a single network point have access to a large stock of sensitive information.

The availability is a problem because there is a single point where a failure can happen. If a failure occur it might have great consequences, such as letting some unauthorized person get the user profiles.

The combined techniques try to solve the above mentioned problems but with only limited success as is described below.

A specific problem in Yenta is that each agent thinks it is responsible to find information about other agents. This means that the world gets very static. New information from a place, it does not know of, might have a hard time to be found by the agent. Another problem is that the agents are supposed to match interests with each other, this means that the different agents need to have an agreed representation or comparison method. This means lack of flexibility. A problem is also that the focus is on the consumers' way of finding other consumers with similar interests, and not on how the content providers reach the consumers.

The ACORN system have a specific problem of limited centralization, that is, it needs places for the agents to meet to get to know more agents. Another problem is that of serendipity. It could also be a problem to incorporate it in today's Internet because the providers and consumers must start to use it at the same time.

SUMMARY OF THE INVENTION

The present invention solves a problem with how to automatically or semi-automatically find and retrieve information for a user according to his preferences.

Another problem which a preferred embodiment of the present invention solves, is how to achieve an efficient, automatic, parallel content-based search.

The object of the present invention is thus to achieve a flexible and efficient information retrieving system.

Another object of the present invention is to achieve an efficient, automatic, parallel search according to a users preferences.

The problem, described above, with how to automatically or semi-automatically find and retrieve information for a user according to his preferences, is solved by sending an information object from a first interest agent to a second interest agent. Said information object comprising electronic information, a first array of references to other interest agents which recommends the electronic information and a second array of references to other interest agents which are indifferent to the content of the electronic information. Said second interest agent comprises a third array, where each position in said array comprises references to other interest agents and a confidence value. If the first agent which sent the information object is found in said third array and has a high confidence value the electronic information is presented before a user.

In more detail the present invention solves the problems described above by defining interest agents and information objects. Each Interest Agent has a model of the consumer's interest or the content from the provider (the provider's interest). Every user can have many Interest Agents, one for each interest. The formation of the different interests is handled by an Interface Agent interacting with the User.

Information Objects represent information from Interest Agents. An Information Object consists mainly of the information's content and the identifications of the Interest Agents that recommended or routed it. Thus the information object comprises a first list with references to agents recommending the information and a second list with references to agents which has received the information object and sent it further, but which has not taken a decision to recommend said information object or not.

Information, electronic information, documents etc. is used in the following as synonyms.

The Information Object is moved from agent to agent, leaving a trail of recommendations that the Interest Agents use to model the recommending agents. The trail makes it easier for next similar Information Object to be sent along the same path backwards, since the Interest Agent uses its models to choose where to send the Information Objects. All trails compounded makes the flow of recommended documents hit the right Interest Agents. It is a way of routing Information Objects between the agents where each Interest Agent learns where to route incoming Information Objects.

The Interest Agent has to find other Interest Agents matching the interest for the consumer/provider or you could say the task is to tell other Interest Agents what sort of information the agent wants. The Interest Agent has a list with other Interest Agents. For each agent in the list, the list comprises the agents reference (where to respond), a model of the agents interest and a value representing the confidence in the agent. If it is a consumer agent the confidence value represents how much the agent trusts the recommendation received from another consumer agent. The interest agent may be a subscriber of recommendations from other agents, which it has high confidence in. A subscribing agent necessarily receives all recommended information from the agent which it subscribes from. The providers Interest Agent does not use the confidence value.

When an Interest Agent receives an Information Object from another interest agent, it checks which agents have recommended said information object, and updates the model of each recommending agent. If an agent appears in the information object as an recommending agent and is not part of the interest agents list of recommending agents said agent is added to the list. The interest agent also keeps a list of references to agents which has routed an information object to said agent. This list is updated with the agents found in the second list, in the information object, comprising agents which has routed said information object.

If it is a consumer's agent and the confidence in the recommending agents is sufficiently high the information is presented directly to the user. Otherwise the information is matched against the interest model of the interest agent and if the match is good enough the information is presented to the user. There is also a probability proportional to the confidence value for the information to be presented anyway. If the consumer does not recommend it or it is a providers agent the Interest Agent randomly chooses some agents to route the Information Object to based on the similarity to the model of the agents. If the user recommends the information the interest model of the interest agent is updated and the information object is sent to all subscribing agents, and to some agents chosen the same way as when a information object is routed.

When a user finds a document himself which he wants to recommend, or when a search agent finds a document which the user recommends, an interface agent locates the interest agent which model of interest has the closest match to the document. If none of the current interest agents has a close enough match a new interest agent modeling the new interest might be created. The selected interest agent updates its model of interest, creates a information object and sends the information object according to the rules described earlier.

To route Information Objects to agents with different interests than the Interest Agent itself, the agent has a list of agents with low confidence values. For an agent be added to this list the agent must make the list more diverse. This makes it more probable for new Interest Agents to find similar agents. It only has to contact some Interest Agent and send it an Information Object with information. The Information Object is than routed until it reaches some Interest Agent that likes it. After a while when it has sent several Information Objects, it starts to get answers in form of good information from other agents.

The Information Object has a specific time to live, for example a number of routings between different agents.

The Interest Agent for consumers has also a Retrieval Agent that searches the Internet for information according to its interest. This agent does not search from documents that have been recommended by other Interest Agents with a high confidence value, that is it trusts them to do the search. This makes it possible to do a more effective parallel search.

The present invention has the advantage to be a highly distributed solution to a problem with distributed users.

A multi-agent system, such as the present invention describes, has the advantage of speed through parallel computing.

Another advantage with the present invention is robustness through agents with redundant functions and yet another advantage is scalability because of the modular approach.

In the present invention the different user agents are able to search the Internet and recommend information in parallel, since they are coordinating their behaviors. The system will be robust to malfunctioning agents, because the agents that depended on the malfunctioning agents shared the same interest. This means that if an agent disappears it just stops recommending documents and if it starts to recommend in a wrong way the trust for it will decrease and finally it will be ignored. The scalability of the system is secured by the robustness, you can add a new user without disturbing the old agents.

The problem of serendipity is solved in the present invention, by letting recommendations that would have been discarded by the Interest Agent, to be presented anyway with a small probability, based on the confidence in the recommending agent. In the start for a new Interest Agent with no knowledge, recommendations is presented anyway since the Interest Agent wants to be able to model the consumers interest.

The present invention also has the advantage of implementation independent information exchange, which makes the system easy to extend with new agents. The new agents do not have to represent the interests in the same way, but only to understand information objects.

Furthermore, another advantage is that the present invention is easy to integrate with existing technology. A user can start to use an interest agent without any other content providers than the home pages on the Internet. The providers can start to use agents at a later stage.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF PREFERRED EMBODIMENTS

Figure 1:
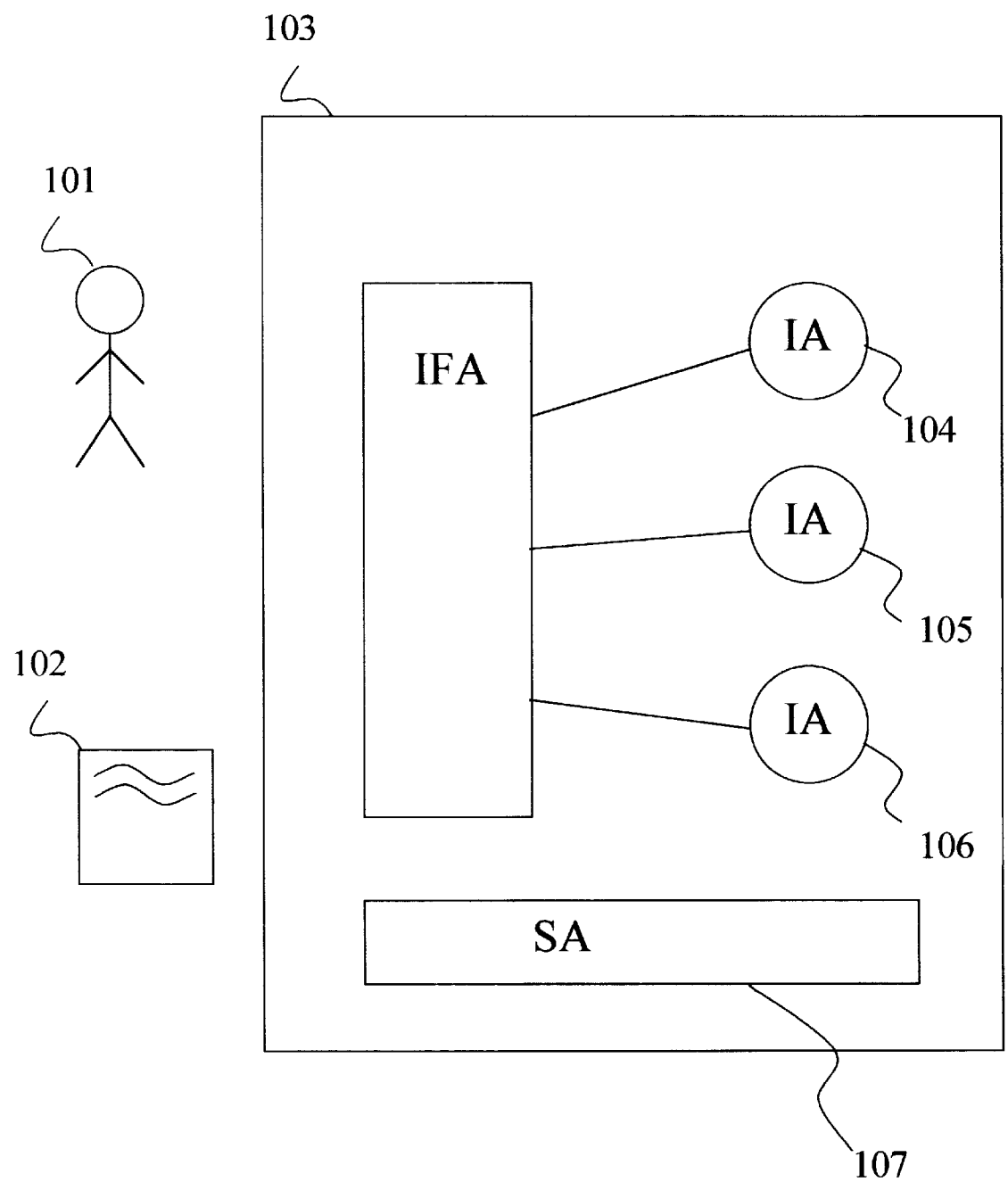
FIG. 1 shows an overview of the different parts according to a preferred embodiment of the invention.

In FIG. 1, a user is denoted 101. The user 101 finds, in one way or another an electronically stored document 102, which the user 101 wants to recommend. The user therefore supplies the document 102 to an interface agent 103. The interface agent 103 makes a model of the content of the electronically stored document 102. The interface agent 103 compares the model of the document with the interest model of an interest agent 104, the interest model of an interest agent 105 and the interest model of an agent 106. The interface agent 103, which has the best match between the model of the document and the interest model receives the document from the interface agent 103. The interface agent 103 updates its model of interest, creates an information object and sends the information object to the other interest agents. This is described in more detail below.

FIG. 1 also shows a search agent 107. The search agent 107 searches databases for information according to the interest models of the interest agents 104, 105 and 106. The search agent 107 also receives instructions from the interest agents 104, 105, 106 to not search some specific documents which the agents 104, 105 and 106 already has knowledge about.

The making of a model of the content of a document may be done in many different ways, and is well described in the known art.

Figure 2:
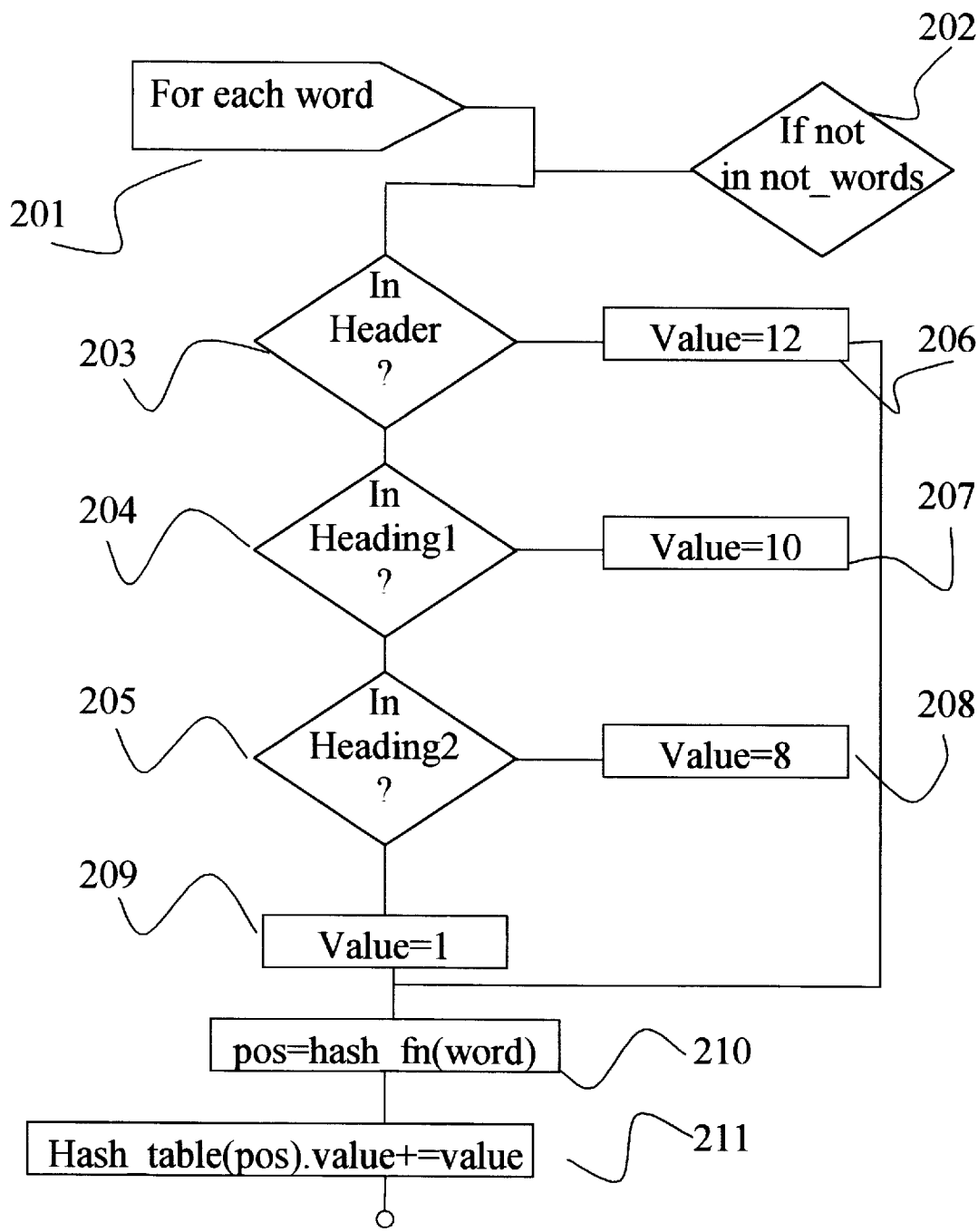
FIG. 2 shows a flow diagram according to a preferred embodiment of the invention.

For sake of clarity a simple solution is shown in FIG. 2. FIG. 2 shows a flow chart for making a model according to a preferred embodiment of the invention. With 201 is a FOR loop denoted. The FOR loop goes over every word in a document. In decision block 202 a check is made to verify that the word is significant. This is to avoid words like 'the', 'and' and for instance different special words like tags. In decision blocks 203, 204, 205 and procedure blocks 206, 207, 208 and 209 a value is assigned to the word. The value is depending on where in the document the word is found. In procedure block 210 a unique integer is calculated from the word using an hash function. This integer is used in procedure block 211 to specify the position in a hash table. The value determined earlier for the word is then added to the current value, at the position in the hash table. This hash table constitutes the model of the document. To be able to make a model of several documents, that is an interest model, or a model of interest, it is easy to just use the same hash table several times. To update one model with another model is simply achieved by adding, position by position, the two hash tables.

Figure 3:
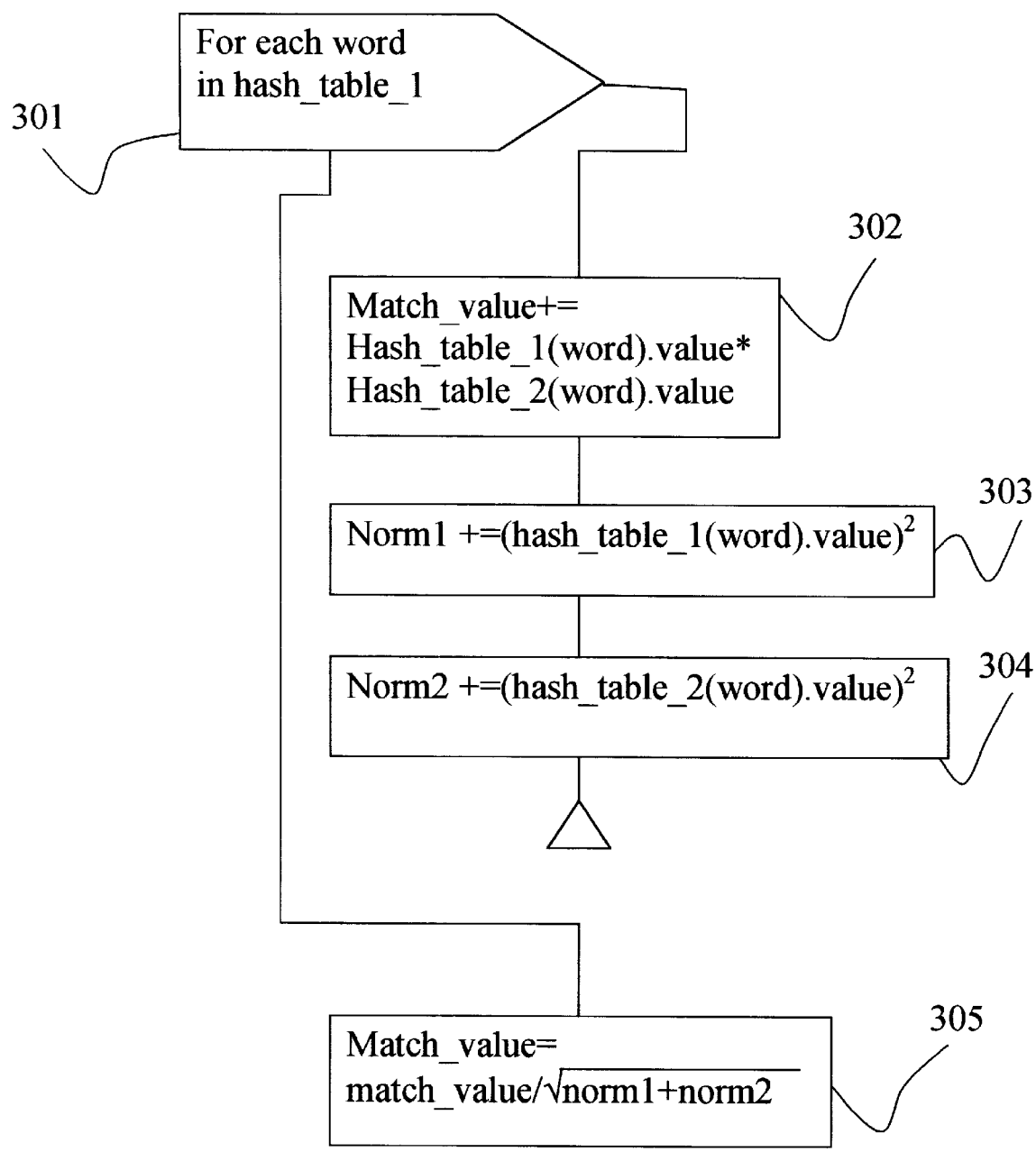
FIG. 3 shows a flow diagram according to a preferred embodiment of the invention.

To compare two hash tables with each other is a known technique in the state of the art. For sake of clarity a simple solution is shown in FIG. 3. FIG. 3 shows a simple flow chart on how to make a comparison between two models, that is, two hash tables, according to a preferred embodiment of the invention. With 301 is a FOR loop denoted. The FOR loop goes over every word in hash table 1. In procedure block 302 a match value is calculated by multiplying the values for a specific word of hash table 1 and hash table 2 and adding the resulting value to the match value. If a word do not occur in any table the value is zero. In procedure block 303 and 304 help values for the normalization is calculated. The match value is then normalized in procedure block 305.

Figure 4:
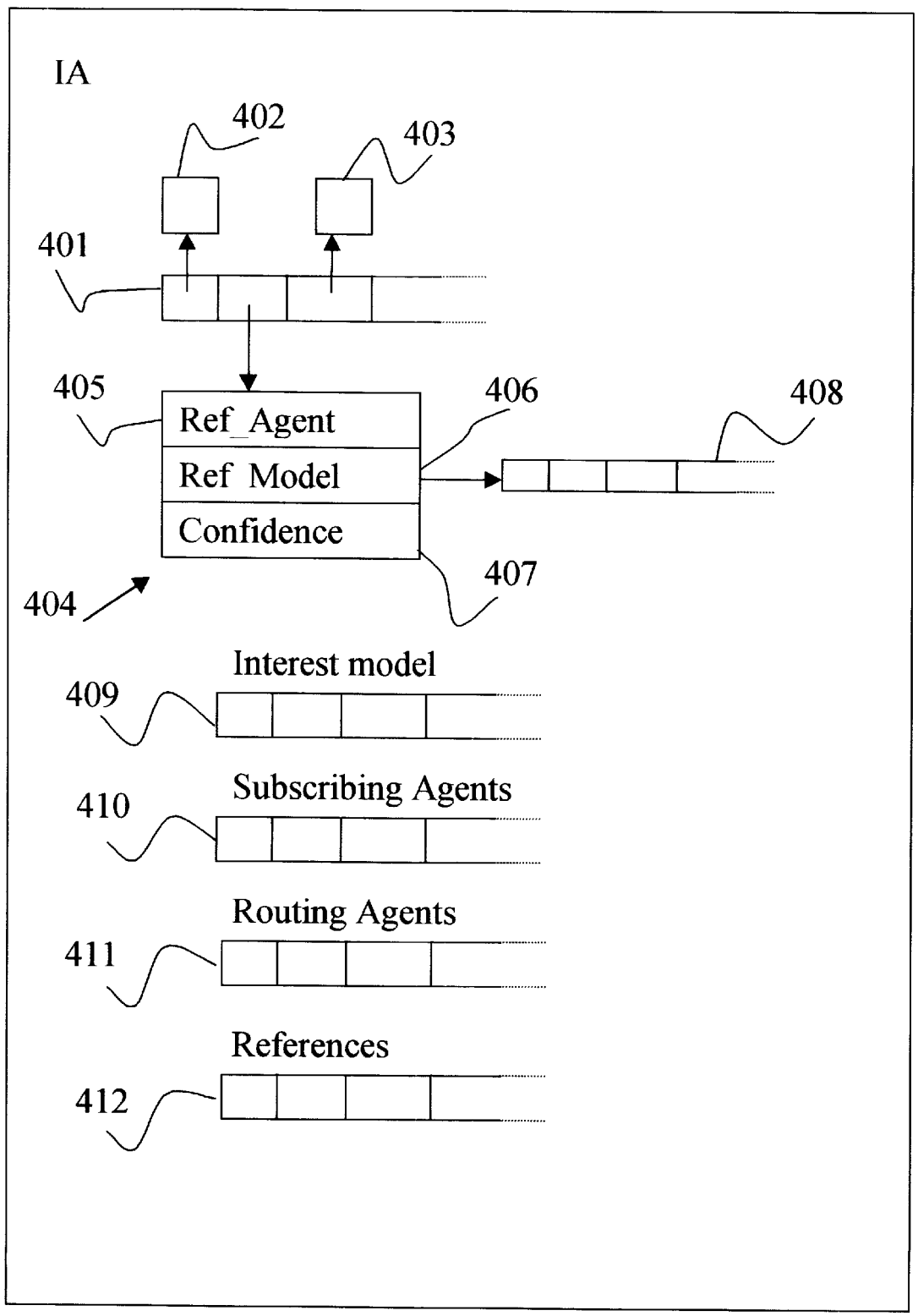
FIG. 4 shows a model of an interest agent according to preferred embodiment of the invention.

In FIG. 4 is a more detailed view of the interest agent disclosed. A first array is denoted 401 and in which each position contains a record. IN FIG. 4 three records are shown, record 402, record 403 and record 404 in the first three positions in the first array 401. Each record comprises three slots, which is shown in record 404. For sake of clarity the slots in records 402 and 403 has been left out in FIG. 4. The first slot, denoted 405 contains a reference to an interest agent, the second slot, denoted 406, contains a reference to a hash table 408, and the third slot in the records contains a confidence value. The hash table 408 represents a model of the interest of the agent referenced in slot 406, and the confidence value represents the amount of trust this agent has in the agent referenced in slot 405. Further more the interest agent comprises an hash table 409, a second array 410 with references to subscribing agents and a third array 411 with references to agents which has routed an information object to this agent but not recommended the information. The hash table 409 represents a model of the interest for this interest agent, that is, what kind of information to present to the user 101. A fourth array with references to electronic documents is denoted 412.

Figure 5:
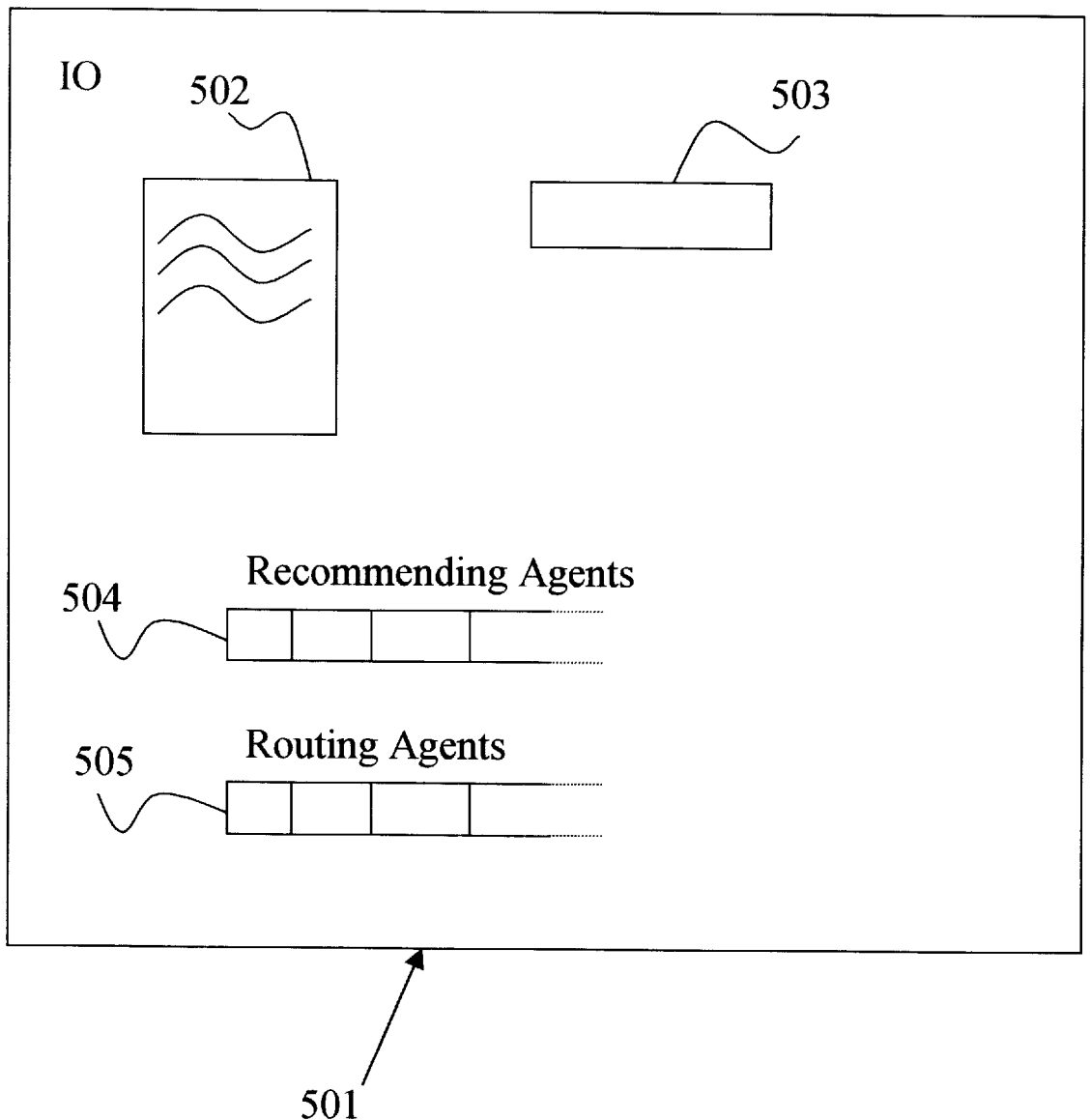
FIG. 5 shows a model of an information object according to a preferred embodiment of the invention.

FIG. 5 discloses an information object 501. The information object 501 comprises electronic information 502, a reference, in this preferred embodiment, an URL (Uniform Resource Locator) 503, a forth array 504 with references to interest agents which has recommended the electronic information 502 and a fifth array 505, with references to interest agents which has not recommended the information 502, but which have routed the information object 501.

Further explanation of the different features of the interest agents and the information objects will now be done with reference to FIGS. 1, 4, 5 and 6.

Figure 6:
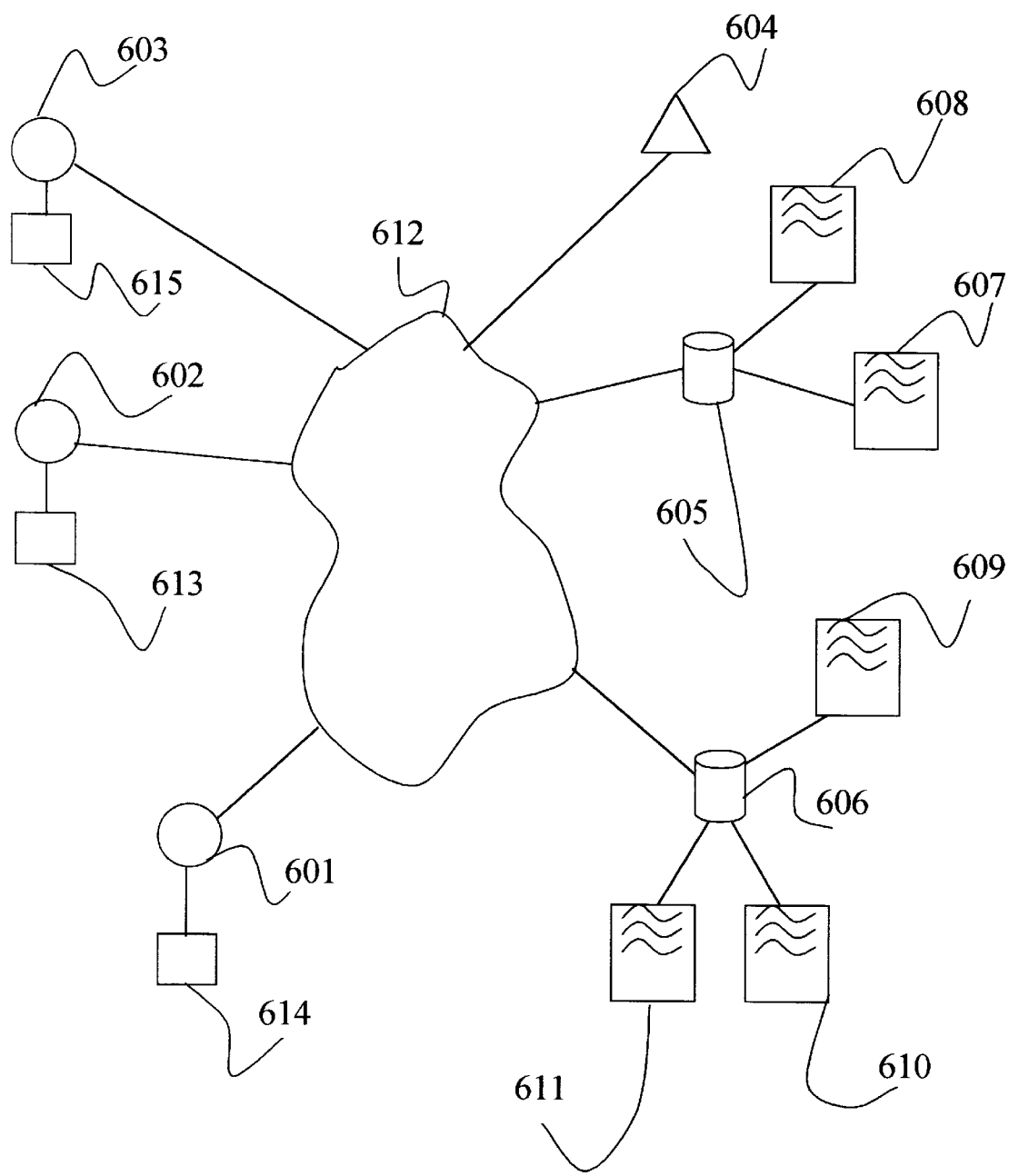
FIG. 6 shows a network with different agents and content providers according to a preferred embodiment of the invention.

In FIG. 6 a first interest agent is denoted 601, a second interest agent is denoted 602 and a third interest agent is denoted 603. The agents 601, 602 and 603 are all consumer agents, that is they are all searching for new information. A provider interest agent is denoted 604. A first database is denoted 605 and a second database is denoted 606. The database 605 contains electronic information of which two documents are denoted 607 and 608 and the database 606 contains electronic information of which three documents are denoted 609, 610 and 611. The network connecting all agents and databases are denoted 612. The network can be the Internet and the databases can be web-servers on the Internet. Search agents are denoted 613, 614 and 615.

The interest agent 602 receives an information object 501 from interest agent 601. The interest agent 602 then creates a model of the electronic information 502 according to the flowchart disclosed in FIG. 2, and updates all models of interest for all interest agents which are part of both the lists 401 and 504. The interest agent 602 also adds all agents, which is not a part of the list of routing agents 411, but which are noted as routing agents in the list 505, to the list 411. The interest agent adds the reference 503 to the electronic information 502 to the list 412, if the confidence value 407, for an interest agent recommending the electronic information 502, is higher than a threshold value.

The interest agent 602 searches the first list 401 to locate interest agent 601. If interest agent 601 is found in the first list 401, that is, if the reference 405 is identical to the reference of interest agent 602 for any position in the list 401 and if the confidence value 407 is higher than a threshold value, the electronic information 502 is presented to the user 101. If the user 101 recommends the information, the interest agent 602 adds its own reference to the list of recommending agents 504 in the information object 501 and sends the information object to all subscribing agents in the list 410.

If interest agent 601 is found in the list 401, but the confidence value 407 is lower than the threshold value, the interest agent 602 compares the model of the electronic information 502 with the agents 602 model of interest 409 according to the flowchart disclosed in FIG. 3. If the match value is higher than a threshold value the electronic information 502 is presented to the user 101. If the match value is lower than the threshold value the electronic information is presented to the user 101 anyway if a random generated number is lower than the confidence value 407 for the interest agent 601. This means that the lower the confidence for the agent 602 the lower the probability that the electronic information 502 will be presented if the confidence value 407 is not higher than a first threshold value and the match value is not higher than a second threshold value.

If the electronic information 502 is presented to the user 101 and the user 101 recommends the information 502, the interest model 409 for the interest agent 602 is updated with the hash table created for the electronic information 502. The interest agent 602 then add its own references to the list of recommending agents 504 in the information object 502 and sends the information object 502 to all interest agents in the list of subscribing agents 410. The confidence value 407 in list 401, for all the interest agents in list 504 which recommended the electronic information 502 is increased. If the confidence value for any of the agents in list 401, for instance interest agent 601, reaches over a threshold value the interest agent 602 will send a subscription message to agent 601. The interest agent 601 will then add the reference of the interest agent 602 to the list of subscribing agents 410 in the interest agent 601.

If the electronic information 502 is presented to the user 101 and the user 101 does not recommend it, the interest agent 602 add its own reference to the list of routing agents 505 and sends the information object 501 to a specific number of random agents in the list of routing agents 411. The confidence value 407 in list 401, for all the interest agents in list 504 which recommended the electronic information 502 is decreased. If the confidence value for any of the agents in list 401, for instance interest agent 601, drops below a threshold value the interest agent 602 will send a unsubscribe message to agent 601. The interest agent 601 will then remove the reference of the interest agent 602 from the list of subscribing agents 410 in the interest agent 601.

If the information is not presented to the user the interest agent 602 adds its own reference to the list of routing agents 505 in the information object 501 and sends the information object 501 to a specific number of random agents in the list 411.

The search agent 613 may also search the databases 606 and 605 for information. This search may be performed on a regular basis, for instance once a day, continually, or may be performed on order from the user 101. Preferably the search is performed according to the rules which any agent, spider and search tool should follow. The search agent 613 receives the model of interest, the list 409, and the list of references 412 from the interest agent 602. The methods of searching databases or computers on Internet are well established in the state of the art and will not be dealt with here. The search agent 613 has one major difference from the state of the art search engines, which is that it will not search in documents referred to in the list of references 412. This means that if a trusted interest agent, that is with high enough confidence, has judged a document it will not be searched again by this agent. The result is an effective parallel search.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for finding and retrieving electronic information in a network, wherein:

a first interest agent sends an information object to a second interest agent;

said information object comprises electronic information, a first array of references to interest agents recommending said electronic information and a second array of references to interest agents which are indifferent to said electronic information;

said second interest agent comprises a third array where each position in said third array comprises at least a reference to an interest agent and a corresponding confidence value, and said second interest agent presents said electronic information to a user in dependence on the confidence value of the first interest agent;

the second interest agent further comprises a first model of interest, and when the confidence in said first interest agent is not high enough to present the information, the electronic information is presented if the electronic information in said information object and said first model of interest of the second interest agent match; and the first model of interest comprises a first hash table, in which table a unique word has a unique position and where each position has a value indicating the importance of said position.

2. A method according to claim 1, wherein when the electronic information and said first model do not match, the electronic information is presented in dependence on a probability factor.

3. A method according to claim 1, wherein said second interest agent sends said information object to other interest agents if the user recommends the electronic information.

4. A method according to claim 3, wherein said second interest agent further comprises a fourth array comprising references to subscribing interest agents, and the second interest agent sends said information object to all interested agents in said fourth array if the user recommends said electronic information.

5. A method according to claim 4, wherein said second interest agent further comprises a fifth array of references to interest agents, and said second interest agent sends said information object to a specific number of random interest agents in said fifth array.

6. A method according to claim 5, wherein said second interest agent sends said information object to at least one interest agent in said third array, said fourth array or said fifth array.

7. A method according the claim 4, wherein if said second interest agent receives a message indicating a subscription from a third interest agent, then the reference of said third interest agent is added to said fourth array.

8. A method according to claim 1, further comprising:
first sorting the words in said electronic information in a second hash table giving values to said words in dependence on a) the number of occurrences, b) position in the electronic information, or c) tags, multiplying said second hash table with said first hash table thus receiving a number, wherein if said number is higher than a threshold value then the electronic information and said first model of interest match.

9. A method according to claim 8, wherein said second interest agent sends said information object to at least the interest agent in said third array which has the best match.

10. A method according to claim 8, wherein:
a user supplies an electronic document to an interface agent;
said interface agent creates a model of said electronic document;
said interface agent supplies said electronic document to an interest agent whose model of interest has the closest match to the model of said electronic information.

11. A method according to claim 1, wherein:
said second interest agent further comprises a sixth array comprising references to electronic information, and said information object further comprises a reference address to said electronic information;
when said second interest agent receives said information object from said first interest agent, the second interest agent adds the reference address to the electronic information to said sixth array if the confidence in said first interest agent is higher than a threshold value;
said second interest agent supplies said first model of interest and said sixth array to a search agent;
said search agent searches databases in the network for electronic information matching said first model of interest and avoids searching electronic information referenced in said sixth array; and
said search agent supplies electronic information to said second interest agent when a match occurs.

12. A method according to claim 1, wherein each position in said third array in said second interest agent further comprises a reference to a second model of interest for the interest agent that is referenced in the position.

13. A method according to claim 12, wherein said second model of interest comprises a third hash table, in which table a unique word has a unique position and where each position has a value indicating the importance of the corresponding word.

14. A method according to claim 12, wherein when said second interest agent receives an information object:
all second models of interest for corresponding interest agents referenced in the third array, which have an identical reference to any interest agent in said first array in said information object, are updated;
all references to interest agents in said first array which are not found in said third array are added to said third array; and
all references to interest agents in said second array which are not found in said fifth array are added to said fifth array.

15. A method according to claim 14, wherein:
said second model of interest comprises a third hash table, in which table a unique word has a unique position and where each position has a value indicating the importance of the corresponding word; and
said update is performed by determining a value for each unique word in said electronic information, wherein the value is determined in dependence on at least a) the number of occurrences of the unique word in said electronic information, b) the position in said electronic information of the unique word, or c) tags, and the determined value is added to the value at the position in said third hash table of the unique word.

16. A method according to claim 1, wherein said second interest agent sends a message to a third interest agent in said third array, indicating a subscription, if the confidence value corresponding to said third interest agent is higher than a threshold value.

17. A method according to claim 1, wherein:
said first interest agent adds its own reference to said first array in said information object if the user approves the present electronic information; and
said first interest agent adds its own reference to said second array in said information object if the user does not respond to the presentation of said electronic information.

18. A method according to claim 1, wherein:
if said electronic information is presented to a user and said user recommends said electronic information, then the confidence value in said first array for all interest agents which have recommended said electronic information is increased; and
if said electronic information is presented to a user and said user does not recommend said electronic information, then the confidence value in said first array for all interest agents which have recommended said electronic information is decreased.

19. A method according to claim 1, wherein the electronic information is presented to a user by displaying the electronic information on a monitor, and said user recommends said information by clicking on a button displayed on said monitor.

* * * * *